Patented June 16, 1936

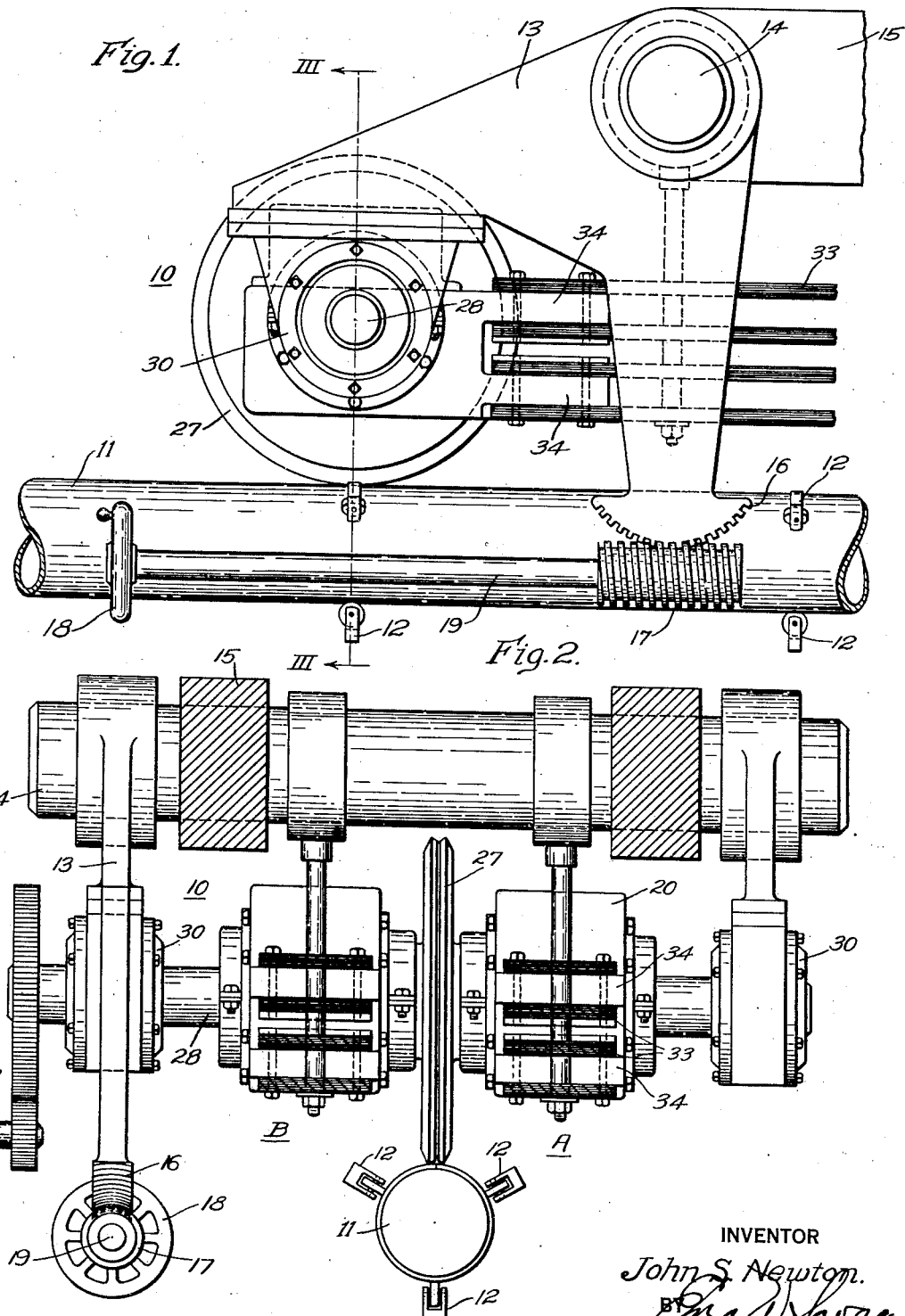

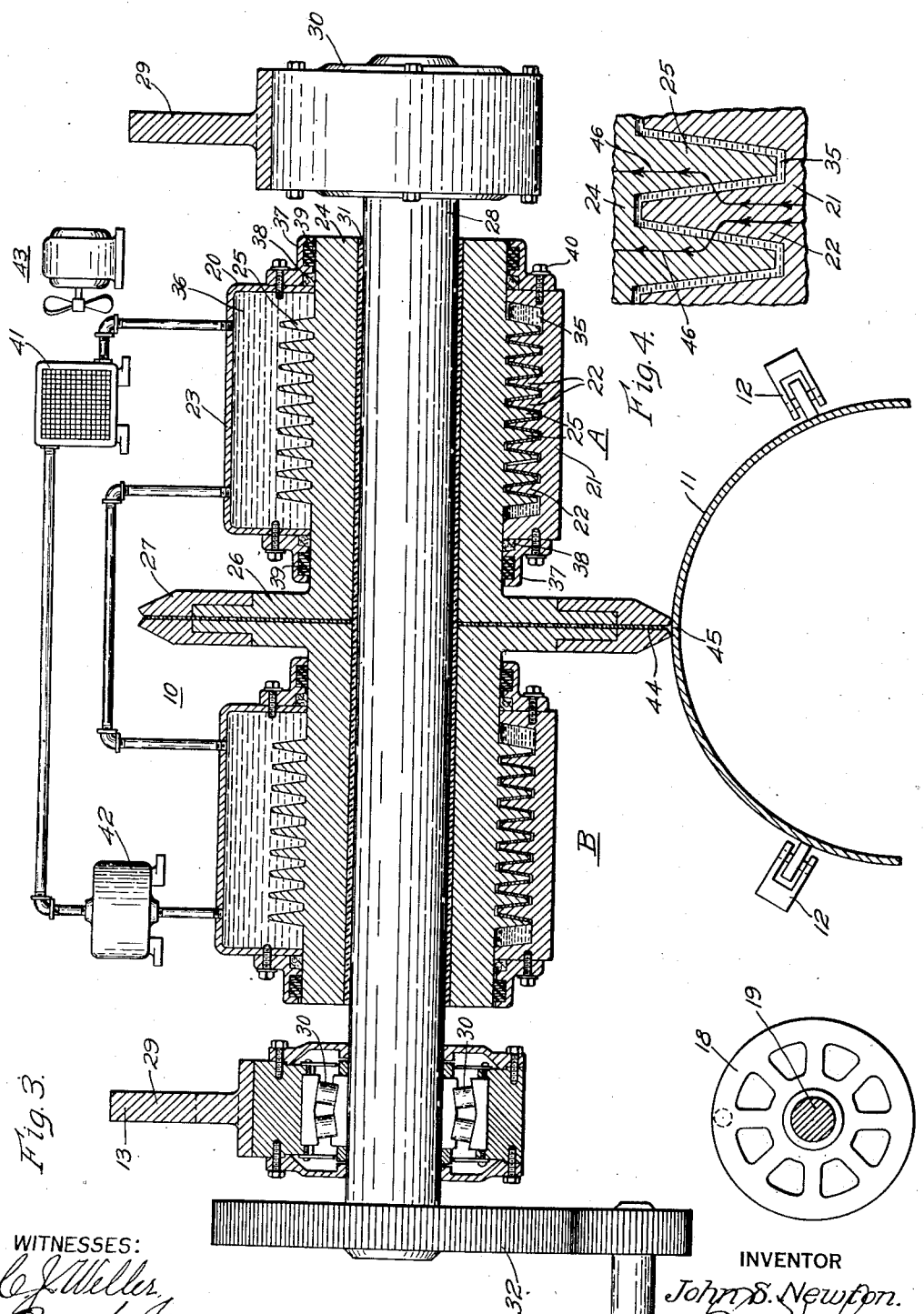

2,044,180

UNITED STATES PATENT OFFICE 2,044,180

MERCURY COLLECTOR RESISTANCE WELDING

John S. Newton, Forest Hills, Pa., assignor to Westinghouse Electric & Manufacturing Company, East Pittsburgh, Pa., a corporation of Pennsylvania Application November 29, 1933, Serial No. 700,262

8 Claims. (Cl. 219—6)

This invention relates generally to current collectors, and more particularly to current collectors suitable for carrying heavy electric currents such as employed in electric welding.

The current collectors heretofore employed for transferring heavy electric currents such as required for welding from a bus bar to a rotating member are unsatisfactory for one reason or another. Those that employ liquid metallic conductors, such as mercury between the stationary and rotating member, fail because of the pinch effect which results from the magnetic forces set up by the flow of heavy currents. This pinch effect imposed on a liquid conductor may result in interruption of the electric circuit. The copper leaf brush type of collector is unsatisfactory because the collector and brushes burn or are damaged in other ways.

The object of the invention is to provide for transferring large electric currents from bus bars to rotating electrodes such as the welding wheels employed in resistance-welding of various kinds.

It is also an object of the invention to provide a plurality of paths for a heavy electric current such as employed in welding and so controlling the direction of flow of the current in the different paths that the magnetic force set up by the current flowing in one path is in opposition to the magnetic force set up by the current flowing in another to provide an equalization of magnetic forces on the liquid conductor.

Other objects of the invention will in part be obvious and, will in part, appear thereinafter.

The invention accordingly is disclosed in the accompanying drawings and comprises the features of construction, combination of elements and arrangement of parts which will be exemplified in the structure hereinafter set forth and the scope of the application of which will be indicated in the claims.

For a fuller understanding of the nature and objects of the invention reference may be had to the following detailed description taken in connection with the accompanying drawings, in which Figure 1 is a view in side elevation of a current collector constructed in accordance with this invention, Fig. 2 is a view in end elevation of the current collector illustrated in Fig. 1, Fig. 3 is an enlarged view in vertical section taken along the line III—III of Fig. 1, and Fig. 4 is an enlarged view in section of the meshing vanes showing diagrammatically the path of the current when it flows from one vane to another.

Referring now to the drawings and Figs. 1 and 2 in particular, the current collector shown generally at 10 in this embodiment of the invention is applied to apparatus for welding such articles as pipe blanks 11. As illustrated, a plurality of sets of rolls 12, such as are commonly utilized in the art, are provided for pressing the edges of the pipe blank into engagement to cooperate in the welding operation.

The current collector 10 is suspended from a bell crank 13 which is pivotally supported at 14 in a suitable frame 15, not shown because they are well known in the art. In order to actuate the bell crank 13 to raise or lower the current collector, the lower end of the bell crank is provided with a gear segment 16 disposed to mesh with a worm 17. The worm may be actuated in any suitable manner to manipulate the bell crank and current collector and in this instance a hand wheel 18 and shaft 19 is employed.

As shown in Figs. 2 and 3, the current collector comprises two units A and B which are identical in structure and it will suffice to describe unit A. The current collector unit A shown in Fig. 3 comprises a two-section case or housing 20. The lower section 21 of the case is semi-cylindrical in shape and the inside is grooved transversely forming a plurality of vanes 22 which in cross section are the shape of a truncated wedge. The case section 21 is made from a metal which is a good conductor of electricity, such for example as forged copper. The case section 21 after it has been grooved will hold a liquid metallic conductor to be referred to hereinafter and may be described as a pot or container.

A second case section 23 which is complementary to the case section 21 is made from a metal or alloy that will resist corrosion, such as brass or bronze. The upper case section is also semi-cylindrical in shape and the two together form a drum shaped case with an opening therethrough for receiving a rotatable member 24 to be described hereinafter.

The hollow cylindrical member 24 extends through the casing 20. As illustrated, a plurality of circumferential vanes 25 are provided on the hollow cylindrical member 24. The vanes 25 are the same size as the vanes 22 provided in the lower section 21 of the case. These vanes mesh with the vanes 22 and are spaced a predetermined distance from the latter, the spacing will depend on the conditions to be met.

On the inner end of the member 24 a stepped circular head 26 is formed for carrying an annular plate 27. The head 26 and plate 27 when assembled constitute a welding wheel.

The hollow cylindrical member 24 will be made from a metal which is a good conductor of electricity such for example as forged copper. In this particular embodiment of the invention, the head 26 is integral with the hollow cylindrical member 24. The annular plate 27 is preferably made from copper and is mounted on the head in some manner as by shrink fitting to establish a good electrical contact as well as a strong mechanical connection.

In order to drive the welding wheel or electrode 27, a shaft 28 is provided. In this instance, the shaft extends through both units of the current collector 10 and is suspended from the bell crank 13 by means of hangers 29 which carry double-tapered roller bearings 30. The hollow cylindrical members 24 and welding wheels are shrunk on the shaft 28 over an insulating bushing 31, thus making a tight fit so that the welding wheel may be driven through the shaft 28. The shaft 28 is extended through one of the bearings 30 and may be driven at any predetermined speed through a reduction gear train 32, by any suitable motor not shown.

Referring to Figs. 1 and 2, flexible bus bars 33 are provided for conveying current from a suitable power source not shown. The bus bars 33 are connected to projections 34 provided on the lower case section 21 which in this instance are formed integral therewith. The bus bars may be laminated, and of sufficient length to permit the required movement of the bell crank 13 to raise and lower the current collector to set it for welding pipes of different sizes.

In order to conduct the current from the vanes 22 provided on the lower case or pot 21, some suitable liquid metal which is highly conductive is provided between the meshing vanes. In this instance mercury 35 is employed. However, other metals such as lead, tin and Wood's metal having a low melting point may be utilized with success. As shown, the depth of the mercury 35 provided in the lower case section 21 is approximately equal to the height of the vanes 22.

It is hard to pack joints to prevent the penetration of mercury but in this instance the mercury does not reach the top of the case section 21 and it may be used for a long time without any leakage.

The case above the mercury is filled with distilled water 36 in order to protect the mercury from oxidation and to assist in keeping it chemically pure. It is well known that impurities in mercury decrease its conductivity and render it thick and pasty and in such a condition it is not satisfactory for use as a conductor between the vanes 22 and 25.

The joint between the case sections and the member 24 is sealed. The seal comprises annular members 37 each having two internal circumferential grooves. In the inner groove a suitable water tight packing such as the canvas packing 38 is provided which tightly closes the joint. In the other circumferential groove an insulating bearing for example a water lubricated micarta bearing is provided for carrying the weight of the casing and super structure so that the canvas packing is not subjected to wear. The annular members 37 are attached to the case by means of set screws 40.

When the collector is in use, heat will be generated and the temperature of the distilled water 36 will be raised. In order to maintain the water at a desired temperature a water cooling system such as shown in Fig. 3 is provided.

It will be readily appreciated that many different types of water cooling systems may be provided. In this instance, a radiator 41 and pump 42 are connected in a pipe system connecting the cases 20 of both units of the current collector. The water is circulated through the radiator which is cooled by a current of air directed against it by a motor driven fan 43.

As shown in Figs. 1 and 3, the welding wheels 27 are separated by an insulating disk 44. Therefore, current will not flow directly from one wheel to another, but when employed for welding a seam 45 in the pipe blanks 11, the current flows from one welding wheel 27 to the other through the meeting portions of the blank 11.

In the operation of the current collector the welding wheels are driven at a slow speed, usually at a linear speed of 50 to 100 feet per minute. The vanes 25 are driven at the same speed.

Since the case 20 can only be moved up and down in order to set it to receive different sizes of pipe, in the operation of the collector as far as the transfer of current is concerned it may be described as a stationary member. The case 20 is directly connected to the bus bars and receives current from them which is collected by a rotatably mounted member in a manner to be described hereinafter.

In operation, current from any suitable power source flows through bus bars 33, projections 34 on unit A, the lower case section 21, vanes 22, mercury 35, vanes 25, the hollow cylindrical member 24, to one of the welding wheels comprising, the head 26 and annular plate 27, through the meeting edge portions 45 of the pipe blank 11 to the other welding wheel. A flow of current in the other unit of the current collector is just the reverse of that described hereinbefore for the unit to the right of the drawing in Fig. 3.

In welding operations very large currents are employed. It is not uncommon to use as much as 150,000 amperes in resistance welding. When such large currents flow through a current collector strong magnetic forces are established. These magnetic forces increase in accordance with the square of the increase of current. Therefore when currents as large as 150,000 amperes are employed the magnetic forces set up are very large.

In the present structure the magnetic forces set up by the flow of current are controlled by providing a plurality of current paths through the collector which result in the dividing of the current into a plurality of current streams half of which flow in one direction and half in a substantially opposite direction. The magnetic forces set up by the current streams flowing in one direction will oppose the magnetic forces set by the current streams flowing in the opposite direction. When the current is divided among a plurality of paths, the total magnetic force acting on any element of the mercury will be decreased directly as the square of the number of paths.

The division of the current flowing through the collector into current streams flowing in opposite directions will be readily understood by reference to Fig. 4. Current flowing in the vane 22 will divide and approximately half will flow to the right and half to the left. The current as it leaves the vane 22 will flow substantially at right angles to the side faces of the vane following generally the direction of the lines 46 having arrowheads marked thereon.

The magnetic force established by the current flowing to the right from the vane 22 through the mercury 35 to one vane 25 will neutralize the magnetic force established by the current flowing to the left from the vane 22 through the mercury 35 to another vane 25. As a result the magnetic forces will be balanced, and the mercury will not be subjected to the well-known pinch effect which results when heavy currents flow through a liquid metallic conductor. In this manner heavy currents may be collected from a stationary current conductor by a rotating current conductor and delivered to a rotating electrode without interruption.

In designing current collectors of this type predetermined relation is maintained between the maximum current to be carried and the surface area of the stationary and rotatable members. In such manner the current density per square inch is kept within predetermined limits.

The provision of vanes as in the present structure gives a large surface area to the stationary and rotatable members in comparison to the over all dimensions of the collector. Therefore a collector of large capacity which is practical in size and economical to build has been provided.

Since many changes may be made in the above embodiment without departing from the spirit of the invention, it is intended that all the subject matter contained herein shall be interpreted as illustrative and not in a limiting sense.

I claim as my invention:

1. In a current collector for transferring heavy electric currents from a bus bar to a rotatably mounted electrode, in combination a container, vanes formed integral with the bottom of the container and extending inwardly, a member rotatably mounted in the container, vanes provided on the rotatable member and disposed to mesh with the vanes in the bottom of the container, a liquid metal provided between the vanes to effect a transfer of current between them, and a chemically pure non-conducting liquid provided in a container above said metallic liquid to protect it.

2. In a current collector for transferring heavy electric currents from a bus bar to a rotatably mounted electrode in combination a container, vanes formed integral with the bottom of the container and extending inwardly, a member rotatably mounted in the container, vanes provided on the rotatable member and disposed to mesh with the vanes in the bottom of the container, a liquid metal provided between the vanes to transfer current and a chemically pure non-conducting liquid provided in the container above said metallic liquid to protect it, and means for controlling the temperature of said chemically pure fluid.

3. In a current collector in combination, a plurality of relatively movable meshing vanes simulating in cross-section the shape of a truncated wedge, the wedge shaped vanes causing the current to flow in different paths inducing opposed substantially balanced magnetic fields and a liquid metal provided between the vanes for transferring electric current.

4. In a current collector in combination, a stationary member and a movable member, meshing vanes provided on said members said vanes simulating truncated wedges in cross-section and a liquid metal provided between the vanes to cause the current to flow from vane to vane the wedge shaped vanes causing the current to flow at substantially right angles to the faces of the vanes to balance the magnetic forces established by the flow of current.

5. In a current collector for transferring heavy electric currents, a plurality of meshing vanes disposed for relative movement, the vanes being wedge shaped, a liquid metallic conductor provided between the vanes, the wedge shaped vanes causing the current flowing from any vane or to any vane to flow in opposite directions at the opposite sides of the vanes thereby to balance the magnetic forces established by the current flowing between the vanes.

6. In a current collector in combination, a stationary member for receiving current, a rotary member associated with the stationary member, a liquid metallic conductor between the members for conducting current and wedge vanes carried by the members for causing the current to flow in a number of paths and in substantially opposite directions in adjacent paths as it flows through the liquid conductor whereby the magnetic force established by the current in one path neutralizes the magnetic force established by the current flowing in the next adjacent path.

7. A current collector comprising, a stationary member for receiving current, a rotary member associated with the stationary member, means for rotating the rotary member at a predetermined speed, a liquid metallic conductor provided between the stationary and rotary members and meshing wedge shaped vanes for causing the current flowing from one member to the other to flow in a number of paths through the liquid metal, the current traversing adjacent paths flowing in different directions causing the magnetic forces established by the current flowing in one path to neutralize the magnetic forces established by current flowing in another path thereby to produce a balanced condition in the magnetic forces established by the current flowing through the liquid metallic conductor.

8. In a current collector for transferring heavy electric currents from a bus to a rotating member, in combination, a container capable of holding the most penetrating conducting metals, vanes provided in the bottom of the container, the vanes in cross-section having the shape of a truncated wedge, the container and vanes being disposed for use as a stationary electrode, a rotatably mounted member provided with a plurality of vanes disposed to mesh with the vanes of the stationary electrode, the vanes of the rotatably mounted member also having the shape of a truncated wedge in cross-section, and a metal in a liquid condition carried in the container establishing electrical connection between the vanes which are wedge shaped and so disposed relative to one another that electrical current may flow without exerting a pinch effect on the liquid metal.

JOHN S. NEWTON.